June 6, 1950 M. C. PORTMANN, JR., ET AL 2,510,716
APPARATUS FOR MOLDING OR CASTING ARTICLES
Filed May 24, 1948
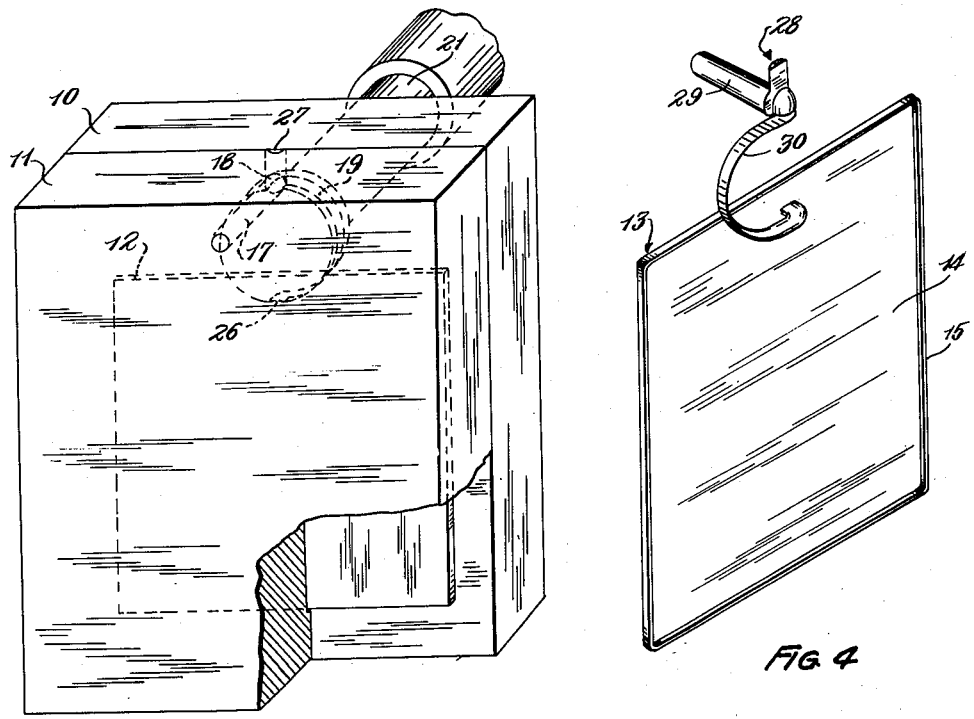
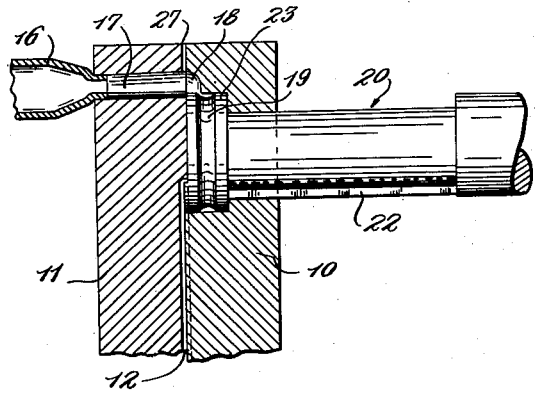
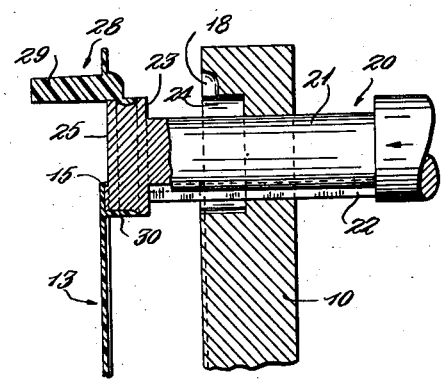
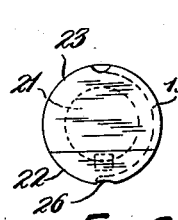
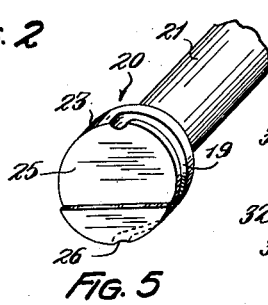
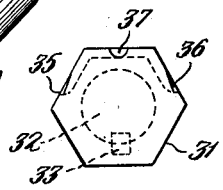
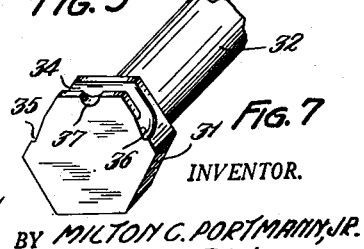
INVENTOR.
BY MILTON C. PORTMANN, JR.
WALTER J. WAGNER
Kwis, Hudson, Boughton & Williams
ATTORNEYS Patented June 6, 1950

2,510,716

UNITED STATES PATENT OFFICE 2,510,716

APPARATUS FOR MOLDING OR CASTING ARTICLES

Milton C. Portmann, Jr., and Walter J. Wagner, Cleveland, Ohio, assignors to The Wagner-Portmann Company, Cleveland, Ohio, a corporation of Ohio Application May 24, 1948, Serial No. 28,788

7 Claims. (Cl. 18—42)

This invention relates to the art of molding or casting and, more particularly, to an improved apparatus for injection molding or die casting articles.

An object of this invention is the provision of an improved apparatus for injection molding or die casting articles in which the material is supplied to the mold cavity from the rear and intermediate the edges thereof so that the front and edges of the article are cast or molded completely smooth and without unwanted projections.

Another object of the invention is the provision of an improved apparatus for injection molding or die casting articles in which the material is fed to the mold cavity in a manner such that the resulting sprue is more easily removed from the apparatus and from the article and without injury to the latter.

A further object of the invention is the provision of an improved apparatus for injection molding or die casting articles in which the means for ejecting the molded or cast article has a passageway constituting the gate for the mold cavity.

A still further object of the invention is the provision of an improved apparatus for injection molding or die casting articles comprising a pair of cooperating mold plates having a cavity therebetween corresponding to the shape of the article being molded or cast, and a member forming at least a part of the rear wall of the cavity and movable relative to said plates to eject a completed article therefrom, the said member having a passageway constituting the gate through which the material is supplied to the mold cavity so that the material enters the mold cavity from the rear and intermediate the edges thereof.

An additional object of the invention is to provide an improved apparatus for injection molding or die casting articles comprising a pair of cooperating mold plates having a cavity therebetween corresponding to the shape of the article to be molded, and a plug mounted for reciprocation in an opening in that one of the mold plates which defines the rear wall of the mold cavity, the forward surface of the said plug in one position of the latter being coplanar with said one mold plate with a portion of the forward surface of said plug forming a part of the rear wall of the cavity, and the plug having a passageway communicating the sprue opening for the material to be molded with the mold cavity intermediate the outer edges of the latter so that the material enters the mold cavity from the rear thereof and intermediate its edges.

The invention further resides in certain novel features of construction and combination and arrangements of parts, and further objects and advantages thereof will be apparent to those skilled in the art to which it pertains from the following description of the present preferred embodiment and a modification thereof, described with reference to the accompanying drawing in which similar reference characters represent corresponding parts in the several views and in which:

Fig. 1 is a perspective view of the improved apparatus of this invention with a portion of one of the mold plates broken away, the mold shown being adapted to cast a wall tile;

Fig. 2 is a fragmentary, vertical section of the apparatus shown in Fig. 1 and illustrating the connection thereto of a portion of the sprue opening of a material injecting apparatus;

Fig. 3 is a fragmentary, vertical sectional view of the apparatus illustrating the manner in which the article is ejected after being molded, a portion of the ejecting plug and the sprue being broken away;

Fig. 4 is a perspective view looking from the rear of a wall tile formed by use of the improved apparatus, the sprue being shown as still attached to the tile;

Fig. 5 is a fragmentary perspective view of the movable member or plug illustrated in Figs. 1, 2 and 3;

Fig. 6 is a front view of the member or plug shown in Fig. 5;

Fig. 7 is a perspective view of a modified form of movable member or plug; and

Fig. 8 is a front view of the plug or movable member shown in Fig. 7.

Injection molding and/or die casting have come into wide spread use for producing a large variety of articles. Where these articles are relatively thin, the feeding of the material to the mold cavity has been conventionally effected by providing a gate or opening for the material adjacent an edge of the cavity in which the article is to be formed. As a result, the article, when removed from the mold, has a sprue attached to an edge thereof which must be removed by breaking, clipping, trimming, or other operation. When the article is to have a smooth edge this sprue projection on the edge is a distinct disadvantage since it must be very carefully trimmed in order to prevent injury to the edge. Even when extreme care is exercised in removing this sprue an article is frequently injured or has a rough spot at this point of removal so that wastage is high and/or a further operation must be performed thereon to smooth the edge. This characteristic is objectionable whenever the article being formed is intended to have smooth edges, such as a cover plate for an electric switch, electrical outlet, or similar articles, and is extremely objectionable when the article formed is a wall tile since a defective edge on the latter is not only unsightly but allows moisture to enter behind the mounted tile and loosen the latter. Therefore, while applicant's invention is not limited to the casting or molding of wall tiles, it will be hereinafter described with particular reference to forming such articles in order to clearly illustrate the manner in which the prior difficulties in die casting or injection molding of articles are obviated.

As shown in the drawing, the apparatus of this invention comprises a two-part mold having a pair of mold plates such as 10 and 11, the cooperating surfaces of which form a substantially air-tight seal adjacent the edges but are suitably machined or formed to provide a mold cavity 12 therebetween, the configuration of which corresponds with that of the article to be produced. In the present embodiment this mold cavity is shown as being substantially rectangular for the production of a wall tile or the like 13 having a planar portion 14 and an integral flange 15.

In accordance with this invention, the material for filling the mold cavity 12 is supplied thereto from the rear and intermediate the edges thereof so that the flange 15 of the resulting tile has no unwanted projections thereon. This may be effected in a number of different manners but is herein shown and illustrated as being accompanied by forming the gate or opening for supplying the material to the mold cavity in a portion of a movable member or plug which also is employed to eject the completed article from the mold. Consequently, in addition to having the sprue located at a point from which it may be severed without injury to the tile, the said sprue may also be easily removed from the gate thus easily effecting cleaning of the material feeding passageway after each casting or molding operation.

As shown in Fig. 2, the sprue outlet 16 of a conventional mechanism for injecting hot material, such as a plastic or the like, under pressure is connected to a passageway 17 extending through the mold plate 11. The forward end of this passageway 17 communicates with a recess 18 in the forward surface of the mold plate 10 exteriorly of the mold cavity which recess 18 also communicates with a groove 19 extending around a portion of the periphery of a movable member or plug, generally designated 20. This plug 20 is illustrated as comprising a shank 21 which is reciprocable in an opening provided in the mold plate 10, the shank 21 being provided with a key 22 cooperating with a suitable keyway in the mold plate 10 to prevent rotation of the plug. The member or plug 20 is moved forwardly and rearwardly, as hereinafter described, by a mechanism which is not shown but which is attached to the rearwardly extending end of the shank 21. The forward end of the shank 21 is preferably provided with an enlarged head 23, which is here shown as integral with the shank but which may be made as a separate member and connected with the shank, and it is this head 23 which is provided with the previously mentioned groove 19.

In the form of the plug shown in Figs. 1, 2, 3, 5 and 6 the head 23 is cylindrical and closely fits within a corresponding cylindrical opening 24 of the mold plate 10 so that when the plug 20 is at its extreme retracted position, as shown in Fig. 2, the forward face 25 of the head 23 is substantially coplanar with the forward surface of the mold plate 10. Moreover, since the opening 24 extends downwardly adjacent the mold cavity 12, the forward face 25 of the plug head 23 constitutes a portion of the rear wall of the cavity 12 and consequently has a shape corresponding with the shape of the adjacent surfaces of the mold plate 10. The groove 19 extends around the periphery of the head 23 to a point below the upper edge of the mold cavity 12, the lower end of the groove communicating with the mold cavity through a passageway formed by slightly recessing the periphery of the lower portion of the head 23 as indicated at 26. Since the head 23 closely fits within the opening 24, the material supplied to the mold through the sprue 16 and openings 17 and 18, can flow only through the groove 19 and the opening 26 and therefore all the material for filling the mold cavity enters the latter from the rear and intermediate the edges thereof. If it be desired to employ more than one set of mold plates with the single sprue 16 a small connecting passage 27 may be provided extending upwardly from the passageway 17 for conducting a portion of the material to a similar set of mold plates but which may be inverted with respect to those shown in Fig. 1.

The operation of an apparatus such as shown in Figs. 1, 2, 3, 5 and 6 of the drawings may be briefly summarized as follows:

The plug 20 is moved to its extreme retracted position as shown in Fig. 2. The mold plates 10 and 11 are firmly engaged and held together by means not shown. If the passageway 27 is not employed with other mold plates, it is plugged. Material is then supplied under pressure through the sprue 16, this material moving through the passageway 17, opening 18 and the groove or passageway 19 and entering the mold cavity 12 through the recess or aperture 26 thereby completely filling the mold cavity. Since, as is well known in the art, the material is supplied under pressure this operation of filling the cavity takes but a relatively short interval of time. After the cavity is filled and the material therein has reached the desired temperature, the mold plates 10 and 11 are separated. This causes the material constituting the sprue 28 to break off from the material remaining in the opening 16 thus leaving a somewhat cylindrical portion 29 corresponding to the opening 17, see Figs. 3 and 4. This portion 29 is attached to the back of the cast or molded article by a semi-circular portion 30 which corresponds to the material left in the groove or passageway 19 of the plunger.

When the plates 10 and 11 are separated, or shortly thereafter, the plug 20 is moved forwardly relative to the plate 10, see Fig. 3, so that the tile or other article is displaced or ejected from the plate 10 but is still attached with the sprue 28, a part of the portion 30 of this sprue being shown broken away in Fig. 3 to facilitate disclosure of the recess or opening 26. In this position of the plug the groove 19 is disposed forwardly of the plate 10 so that the tile or other article together with the sprue 28 may then be easily removed from the plug 20. Hence, the removal of the cast or molded article also effects cleaning of the passageway which formed the gate for the material to be molded. Since this sprue is attached to the rear surface of the tile or other article, which surface need not be smoothly finished, and since the portion 30 of the sprue is relatively thin, it may be easily broken or severed from the article without the need of special tools and without danger of injuring the article. The plug 20 is then retracted and the mold plates 10 and 11 are again engaged whereupon the operations are repeated to form a new article.

The plug 20 may be formed in a variety of configurations other than that illustrated in Figs. 1, 2, 3, 5 and 6. For example, the head of the plug may have a polygonal periphery as shown at 31 in Figs. 7 and 8. Such a head 31 may be attached to, or integral with, a suitable shank such as 32 which is provided with a key 33 or other expedient for preventing rotation therebetween and the mold plate 10. When employing a polygonally shaped head such as 31 the corresponding opening in the mold plate 10 will, of course, have a similar configuration. In the plug shown in Figs. 7 and 8 the gate for the material is provided by a groove or passageway 34 extending from the top of the head downwardly along both sides and terminating in forwardly directed portions which communicate with the mold cavity through small openings provided by slightly cutting away the face of the head 31 as indicated at 35 and 36. The top of the groove or passageway 34 communicates with the passageway 17 in the mold plate 11 by an opening such as 37. The operation of a plug of the type just described in cooperation with the mold plates such as 10 and 11 is substantially the same as that of plug 20, the only difference being the material is now fed to the mold cavity through two gates which communicate with the mold cavity by means of the openings 35, 36 and hence the sprue which remains attached to the completed tile has a slightly different configuration from that shown in Fig. 4. This sprue will, however, be attached to the tile or other article at the rear and intermediate the edges thereof and may be easily severed without injury as above described.

It will be apparent that while the apparatus of this invention has been described with particular reference to casting wall tiles it may be employed for casting articles of other configurations of either plastic or metals such as magnesium, aluminum or the like by suitably shaping the mold cavity 12. Moreover, the advantage of ease in cleaning the gate of the mold by forming the latter in a portion of the ejector member or plug such as 20 may be secured by forming the said ejector member in a variety of configurations other than those herein shown. Furthermore, it is not essential that the mold be disposed vertically as shown, nor is it essential that the material be supplied through an opening provided in the plate 11 since similar results can be achieved by forming a suitable supply opening in the plate 10 and cooperating with the groove or passageway in the plug. Other variations and adaptations of the apparatus will be readily suggested to those skilled in the art after having had the advantages of applicants' disclosure and therefore the apparatus shown and described is to be considered only as illustrative of the invention.

Having thus described our invention, we claim:

1. In an apparatus for molding articles, a pair of cooperating mold plates having a cavity therebetween corresponding to the shape of the article to be formed, a member fitting in an opening provided in the forward surface of that one of the mold plates which defines the rear wall of said cavity with the forward surface of said member flush with the forward surface of said one mold plate and with at least a portion of the forward surface of said member forming a part of the rear wall of said cavity, the said member being provided with a passageway extending around a portion of the periphery thereof with a side of said passageway substantially parallel with and spaced from the forward surface of said one mold plate, the said passageway communicating at one end with the mold cavity inwardly of the outer edges of the latter and the other end of said passageway communicating with a sprue opening for the material to be molded so that the material enters the said cavity from the rear thereof and intermediate its edges, and means for moving the said member forwardly of said one mold plate to thereby displace a molded article from said one mold plate when the mold plates are separated.

2. The combination as defined in claim 1 and further comprising means to prevent relative rotation between said member and said one mold plate.

3. In an apparatus for molding articles, a pair of cooperating mold plates having a cavity therebetween corresponding to the shape of the article to be formed, a plug mounted for reciprocation in an opening provided in that one of the mold plates which defines the rear wall of said cavity, means limiting movement of said plug in one direction in said opening thereby defining one position of said plugs such that the forward surface thereof is coplanar with the forward surface of said one mold plate with a portion of the forward surface of said plug forming a part of the rear wall of said cavity, the said plug having a passageway extending around a portion of the periphery thereof with a side of said passageway substantially parallel with and spaced from the forward surface of said one mold plate, the said passageway communicating at one end with the mold cavity inwardly of the outer edges of the latter and the other end of said passageway communicating with a sprue opening for the material to be molded so that the material enters the said cavity from the rear thereof and intermediate its edges, the said plug being movable forwardly of said one mold plate when the mold plates are separated to thereby displace a molded article from the said one mold plate and dispose the said passageway forwardly of the forward surface of said one mold plate.

4. In an apparatus for molding articles, a pair of cooperating mold plates having a cavity therebetween corresponding to the shape of the article to be formed, a plug mounted for reciprocation in an opening provided in that one of the mold plates which defines the rear wall of said cavity, the forward surface of said plug in one extreme position of the latter being coplanar with the forward surface of said one mold plate with a portion of the forward surface of said plug forming a part of the rear wall of said cavity, the said plug having a passageway extending around a portion of the periphery thereof with a side of said passageway substantially parallel with and spaced from the forward surface of said one mold plate and with one end of said passageway communicating with the mold cavity inwardly of the outer edges of the latter, the said other mold plate having a sprue opening extending therethrough at substantially right angles to the forward surface thereof with the inner end of said sprue opening closely adjacent to and in communication with said passageway at the other end of the latter, whereby the material to be molded enters the said cavity from the rear thereof and intermediate its edges, the said plug being movable forwardly of said one mold plate when the mold plates are separated to thereby displace a molded article from the said one mold plate and dispose the said passageway forwardly of the forward surface of said one mold plate.

5. In an apparatus for molding articles, a pair of cooperating mold plates having a cavity therebetween corresponding to the shape of the article to be formed, a plug mounted for reciprocation in an opening corresponding in shape with that of said plug and provided in the forward portion of that one of the mold plates which defines the rear wall of said cavity, the depth of said opening being substantially equal to the thickness of said plug so that the forward surface of said plug when the latter is seated in said opening is coplanar with the forward surface of said one mold plate with a portion of the forward surface of said plug forming a part of the rear wall of said cavity, the said plug having a groove extending around a portion of its periphery with the sides of said groove substantially parallel with and spaced from the forward surface of said plug and with one end of said groove communicating with the mold cavity inwardly of the outer edges of the latter, the other end of said groove communicating with a sprue opening for the material to be molded so that the material enters the said cavity from the rear thereof and intermediate its edges, and a shank member connected with said plug at the rear thereof, the greatest transverse dimension of said shank member being less than the least transverse dimension of said plug and the said shank member extending exteriorly of said one mold plate through an opening communicating with the said opening for said plug, the said shank member effecting movement of said plug forwardly of said one mold plate when the mold plates are separated to thereby displace a molded article from the said one mold plate and to expose said groove for facilitating the removal of the sprue therefrom.

6. In an apparatus for molding articles, a pair of cooperating mold plates having a cavity therebetween corresponding to the shape of the article to be formed, the mold plate which defines the rear wall of said cavity having an opening therethrough which is enlarged adjacent the forward surface thereof with the enlarged portion of said opening communicating with the said cavity adjacent an edge of the latter, and a plug including head and shank portions, mounted for reciprocation in said opening with the said plug in one extreme position of the latter having the said head disposed in the enlarged portion of said opening, the said head and enlarged portion of the opening having dimensions such that the former closely fits in the latter with the forward surface of the said head coplanar with the forward surface of the rear mold plate thereby forming at least a part of the rear wall of said cavity, the said head having a groove extending around a portion of its periphery intermediate the forward and rear faces thereof with the sides of said groove substantially parallel with the forward face of said head, one end of said groove communicating the mold cavity inwardly of the outer edges of the latter and the other end of said groove communicating with a sprue opening for the material to be molded located beyond the edge of said cavity whereby the material enters the said cavity from the rear thereof and intermediate its edges, the said plug being movable forwardly of said one mold plate when the mold plates are separated to thereby displace a molded article from the said rear mold plate.

7. The combination as defined in claim 6 and further comprising cooperating means upon said shank and said rear mold plate to prevent rotation of said plug when the latter is reciprocated.

MILTON C. PORTMANN, Jr.
WALTER J. WAGNER.

REFERENCES CITED

The following references are of record in the file of this patent:

UNITED STATES PATENTS

| Number | Name | Date |
| --- | --- | --- |
| 2,366,475 | Bartholomew | Jan. 2, 1945 |
| 2,360,011 | Popp | Oct. 10, 1944 |

Certificate of Correction

June 6, 1950

Patent No. 2,510,716

MILTON C. PORTMANN, Jr., ET AL.

It is hereby certified that error appears in the printed specification of the above numbered patent requiring correction as follows:

Column 6, line 29, for the word "plugs" read *plug*;

and that the said Letters Patent should be read with this correction therein that the same may conform to the record of the case in the Patent Office.

Signed and sealed this 5th day of September, A. D. 1950.

[SEAL]

THOMAS F. MURPHY,
*Assistant Commissioner of Patents.*